US009796223B2

(12) United States Patent
Lamgaday et al.

(10) Patent No.: US 9,796,223 B2
(45) Date of Patent: *Oct. 24, 2017

(54) VALVE STEM-BASED AIR MAINTENANCE TIRE AND METHOD

(71) Applicant: THE GOODYEAR TIRE & RUBBER COMPANY, Akron, OH (US)

(72) Inventors: Robin Lamgaday, Wadsworth, OH (US); Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 188 days.

This patent is subject to a terminal disclaimer.

(21) Appl. No.: 14/945,995

(22) Filed: Nov. 19, 2015

(65) Prior Publication Data

US 2017/0144492 A1    May 25, 2017

(51) Int. Cl.
*B60C 23/12*  (2006.01)
*B60C 23/00*  (2006.01)
(Continued)

(52) U.S. Cl.
CPC ............ *B60C 23/12* (2013.01); *B60C 23/004* (2013.01); *B60C 29/005* (2013.01); *B60C 29/02* (2013.01); *B60C 29/068* (2013.01); *B60S 5/043* (2013.01)

(58) Field of Classification Search
CPC ... B60C 23/12; B60C 23/004; B60C 23/0496; B60C 29/00; B60C 29/005; B60C 29/02; B60C 29/06
See application file for complete search history.

(56) References Cited

U.S. PATENT DOCUMENTS 1,050,886 A    1/1913    Wetherell
1,134,361 A    4/1915    Wetherell
(Continued)

FOREIGN PATENT DOCUMENTS

DE    3433318        3/1986
EP    2935158 A1    2/2016
(Continued)

OTHER PUBLICATIONS

European Search Report dated Mar. 14, 2017 for Application Serial No. EP16199096.

*Primary Examiner* — Jason R Bellinger
(74) *Attorney, Agent, or Firm* — Robert N. Lipcsik

(57) ABSTRACT

An air maintenance tire assembly includes a tire having a tire cavity bounded by first and second sidewalls extending to a tire tread region, an air pump for generating pressurized air for maintaining air pressure within the tire cavity at a preset pressure level, and a faceted valve housing disposed adjacent an outward end of the valve stem and operative to selectively open and close pressurized air flow from the valve stem internal passageway into the tire cavity. The first sidewall has at least one bending region operatively bending within a rolling tire footprint and a sidewall groove defined by groove sidewalls positioned within the bending region of the first tire sidewall. The groove deforms segment by segment between a non-deformed state and a deformed, constricted state in response to the bending of the first sidewall bending region within the rolling tire footprint.

15 Claims, 6 Drawing Sheets

(51) Int. Cl.
*B60C 29/00* (2006.01)
*B60C 29/06* (2006.01)
*B60C 29/02* (2006.01)
*B60S 5/04* (2006.01)

(56) References Cited

U.S. PATENT DOCUMENTS

| | | | |
|---|---|---|---|
| 1,682,992 A | 9/1928 | Summers | |
| 3,304,981 A | 2/1967 | Sheppard | |
| 3,833,041 A | 9/1974 | Glad | |
| 4,922,984 A | 5/1990 | Dosjoub et al. | |
| 5,052,456 A | 10/1991 | Dosjoub | |
| 6,772,812 B1* | 8/2004 | Hamilton | B60C 23/004 |
| | | | 137/224 |
| 7,117,731 B2 | 10/2006 | Hrabal | |
| 7,117,910 B2* | 10/2006 | Akahori | B60C 23/12 |
| | | | 152/419 |
| 8,042,586 B2 | 10/2011 | Losey et al. | |
| 8,113,254 B2 | 2/2012 | Benedict | |
| 9,533,534 B2* | 1/2017 | Lamgaday | B60C 23/004 |
| 2009/0294006 A1 | 12/2009 | Hrabal | |
| 2015/0122390 A1 | 5/2015 | Durr | |
| 2017/0043630 A1* | 2/2017 | Lin | B60C 23/12 |
| 2017/0144493 A1* | 5/2017 | Lamgaday | B60C 11/00 |

FOREIGN PATENT DOCUMENTS

| | | |
|---|---|---|
| EP | 3012126 A1 | 4/2016 |
| EP | 3130487 A1 | 2/2017 |
| RU | 2106978 | 3/1998 |
| SE | 183890 | 5/1963 |
| WO | WO2003049958 | 6/2003 |
| WO | WO2005012009 A1 | 7/2004 |
| WO | 2007134556 | 11/2007 |
| WO | WO2010008338 A1 | 1/2010 |

* cited by examiner

VALVE STEM-BASED AIR MAINTENANCE TIRE AND METHOD

FIELD OF THE INVENTION

The present invention relates generally to air maintenance tires and, more specifically, to a valve stem-based air maintenance tire for maintaining tire air pressure.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

SUMMARY OF THE INVENTION

An air maintenance tire assembly in accordance with the present invention includes a tire having a tire cavity bounded by first and second sidewalls extending to a tire tread region, air pumping means for generating pressurized air for maintaining air pressure within the tire cavity at a preset pressure level, and a faceted valve housing disposed adjacent an outward end of the valve stem and operative to selectively open and close pressurized air flow from the valve stem internal passageway into the tire cavity. The first sidewall has at least one bending region operatively bending within a rolling tire footprint and a sidewall groove defined by groove sidewalls positioned within the bending region of the first tire sidewall. The groove deforms segment by segment between a non-deformed state and a deformed, constricted state in response to the bending of the first sidewall bending region within the rolling tire footprint.

According to another aspect of the assembly, the valve housing includes a check valve for maintaining air pressure in the tire cavity at the preset pressure level.

According to still another aspect of the assembly, the valve housing is constructed of a polymer.

According to yet another aspect of the assembly, the valve housing further includes a relief valve that opens and closes to place the air pumping means in "open" and "closed" conditions.

According to still another aspect of the assembly, the air pumping means has a tube within the first tire sidewall. The tube is incrementally flattened by rotation of the tire under load.

According to yet another aspect of the assembly, the valve housing further includes a manual fill assembly disposed at an outer end of the valve housing.

According to still another aspect of the assembly, a manual fill assembly of the valve housing includes a check valve such that the tire cavity may be manually pressurized identically to manual pressurization directly through the valve stem.

According to yet another aspect of the assembly, as the tire continues to rotate under load along a ground surface, a part of a tube of the air pumping means is sequentially squeezed when the part is adjacent a tire footprint.

According to still another aspect of the assembly, sequential flattening of part of the air pumping means, segment by segment, directs air to the valve housing and the tire cavity.

According to yet another aspect of the assembly, when air pressure within the tire cavity is below the preset pressure level, air passes through the valve housing, through the valve stem, and into the tire cavity.

According to still another aspect of the assembly, when air pressure in the tire cavity is at the preset pressure level, air is vented through a relief valve to atmosphere.

A method maintains a predetermined air pressure within a tire. The method includes the steps of: positioning an elongate valve stem to project outward from a tire cavity of the tire, the valve stem having an elongate internal air passageway for delivering pressurized air into the tire cavity; positioning a faceted valve housing onto the valve stem; selectively opening and closing the valve stem internal air passageway to control pressurized air flow from the valve stem internal passageway into the tire cavity; and coupling an air pumping means to the valve housing such that pressurized air is directed through an outward end of the valve stem internal passageway and into the tire cavity. The air pumping means includes a first sidewall of the tire with at least one bending region operatively bending when adjacent a tire footprint and a sidewall groove defined by groove sidewalls positioned within the bending region of the first tire sidewall, the groove deforming segment by segment between a non-deformed state and a deformed, constricted state in response to the bending of the first sidewall bending region within the tire footprint.

According to another aspect of the method, further steps include supporting the tire on a rim, extending the valve stem from the tire through an aperture in the rim, and positioning the valve housing external to the tire cavity.

According to still another aspect of the method, a check valve in the valve stem selectively opens and closing an air passage from the valve stem passageway into the tire cavity.

According to yet another aspect of the method, a further step includes incorporating a relief valve within the valve housing.

According to still another aspect of the method, further steps include coupling an internal chamber of the valve housing to receive pressurized air the air pumping means and selectively opening and closing a check valve of the valve stem responsive to a presence and absence of pressurized air within the internal chamber.

According to yet another aspect of the method, further steps include extending the valve stem from the tire through an aperture extending through a rim supporting the tire and mounting the valve housing to the valve stem.

According to still another aspect of the method, further steps include positioning an air passageway within a first tire sidewall operatively located to compress, segment by segment, from an expanded diameter to a substantially reduced diameter responsive to a bending strain introduced into the first sidewall from the rotating tire under load thereby forcing air, segment by segment, along the sidewall air passageway and connecting the air passageway to a radially outward end of the valve stem thereby directing pressurized air to the tire cavity.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Faceted" means having smooth flat planar surfaces.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Inward" directionally means toward the tire cavity.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Outward" directionally means in a direction away from the tire cavity.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The present invention will be described by way of example and with reference to the accompanying drawings, in which.

DETAILED DESCRIPTION OF AN EXAMPLE OF THE PRESENT INVENTION

Figure 1:
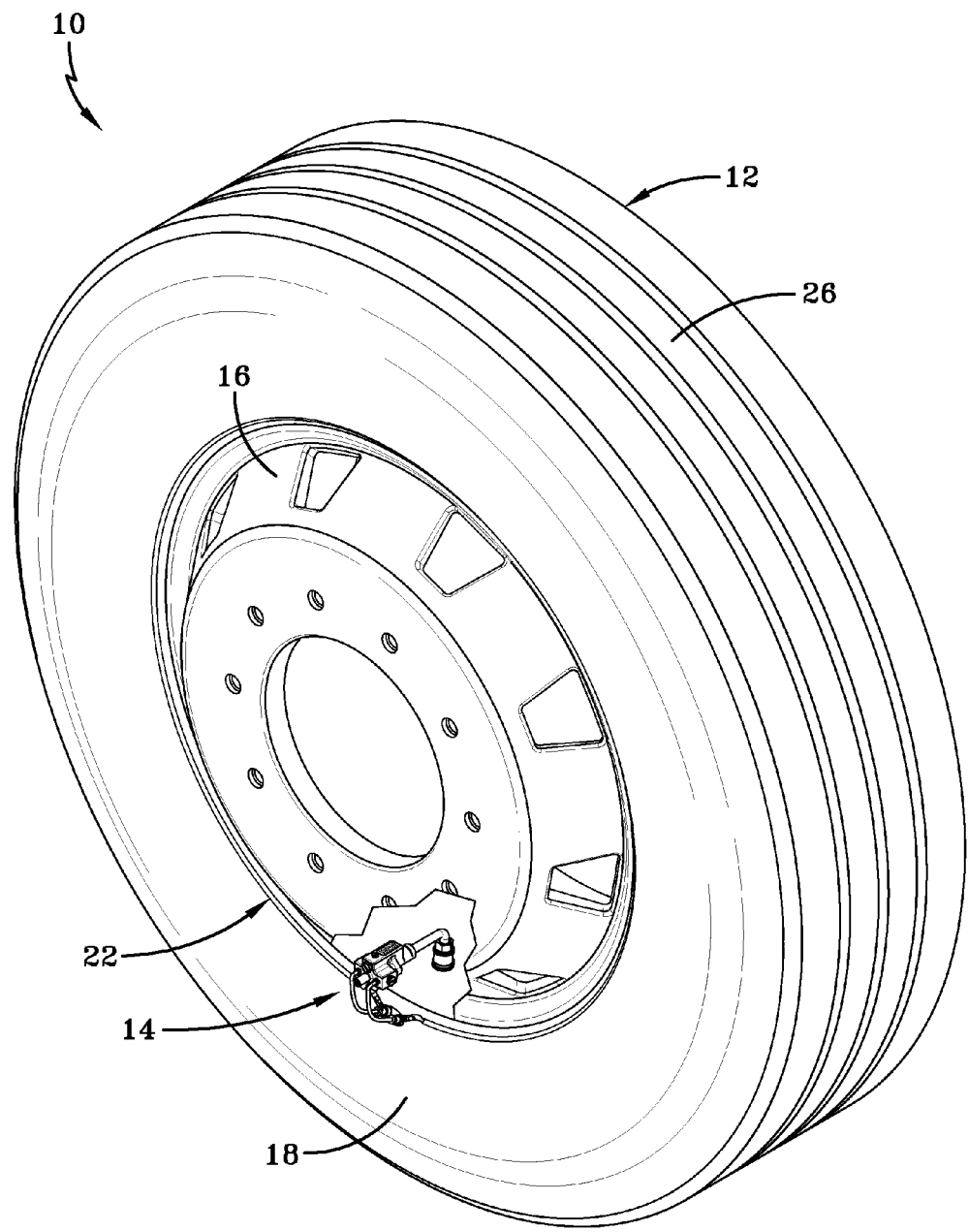
FIG. 1 is a schematic perspective view showing the assembly, tire, tube and pump location.
Figure 2:
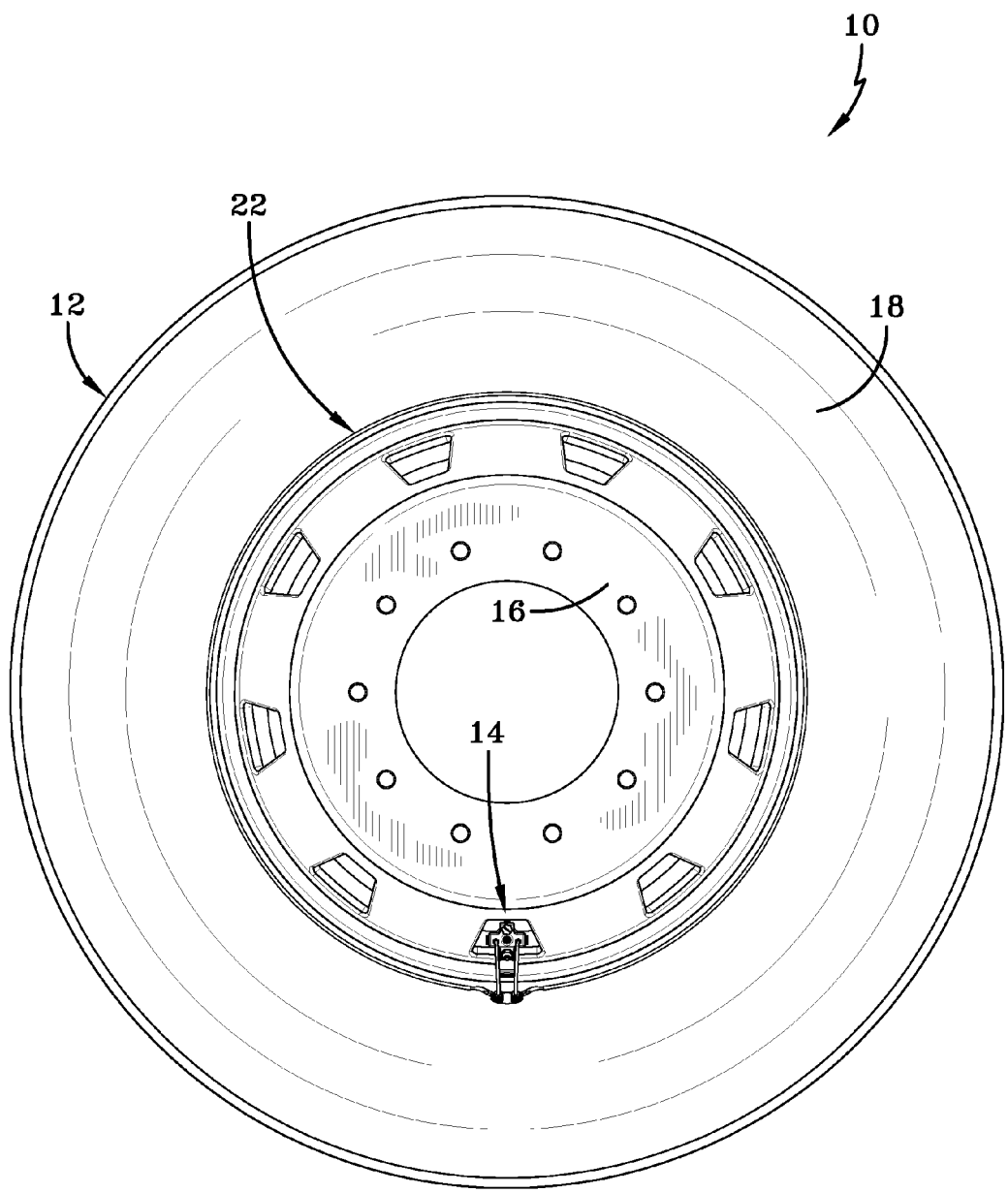
FIG. 2 is a schematic side view of FIG. 1.
Figure 3:
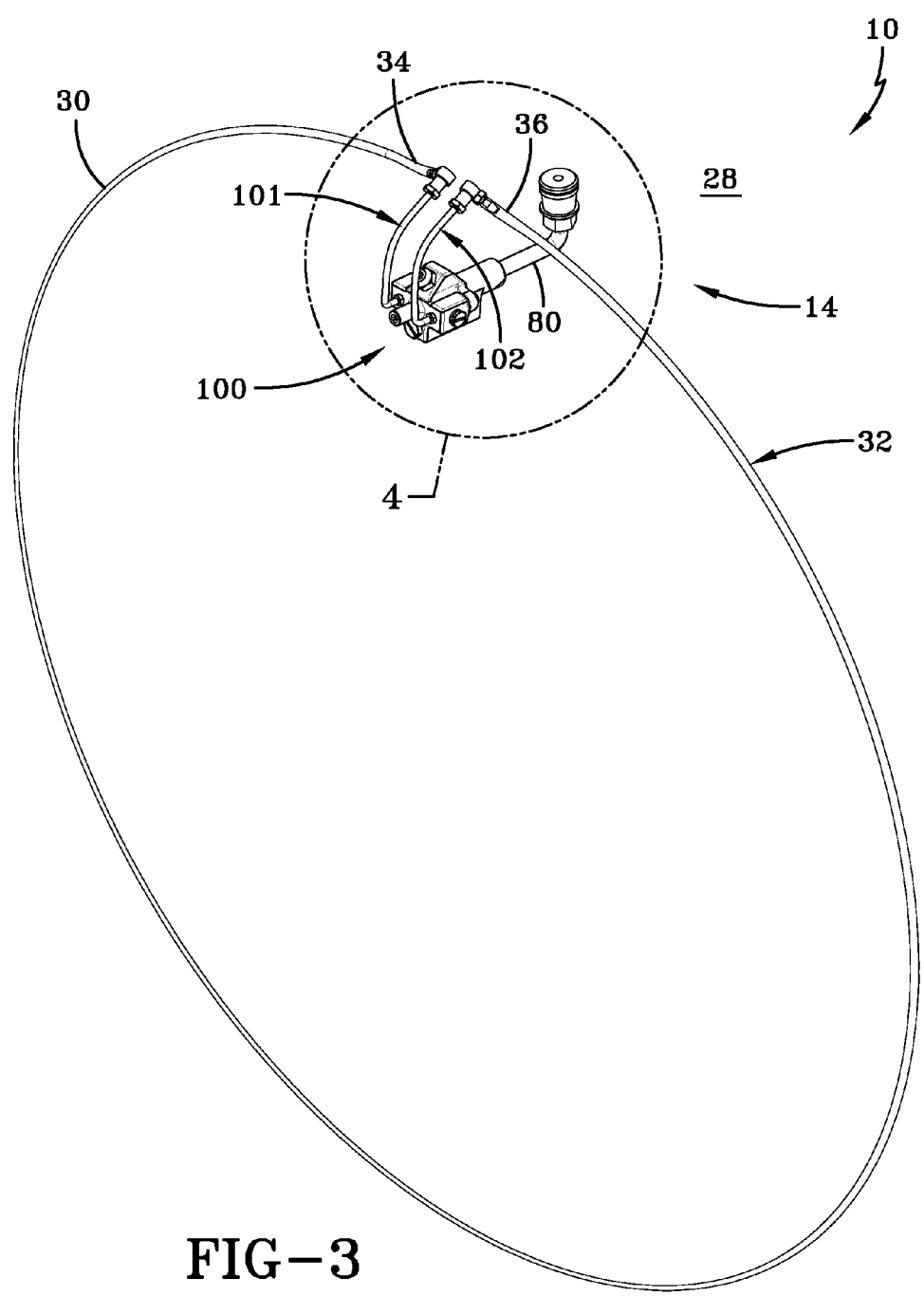
FIG. 3 is a schematic view showing a pump sub-assembly with the pump tube connection to an AMT valve stem regulator in accordance with the present invention.
Figure 4:
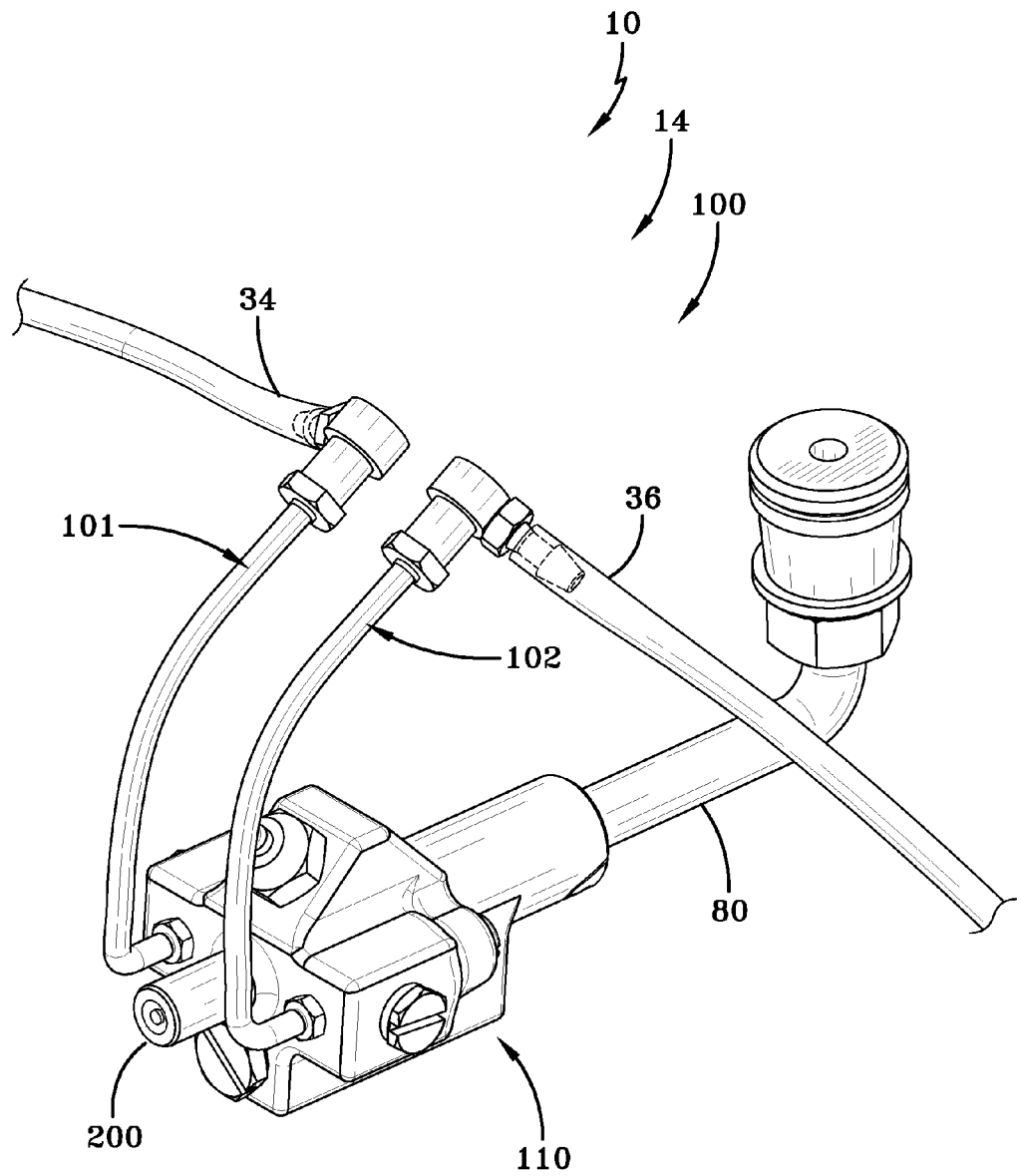
FIG. 4 is a schematic enlarged view taken from FIG. 3 showing the pump tube transfer housing and the tire AMT valve stem regulator.

Referring to FIGS. 1-4, a tire assembly 10 in accordance with the present invention may include a tire 12, a peristaltic pump assembly 14, and a wheel rim 16. The tire 12 may mount in conventional fashion to the rim 16. The tire 12 may be of conventional construction, having a pair of sidewalls (only sidewall 18 being shown) extending from opposite bead areas (only bead area 22 being shown) to a crown or tire tread region 26. The tire 12 and rim 16 together enclose a tire cavity 28.

The peristaltic pump assembly 14 may include an annular air tube 30 that encloses an annular groove, or passageway. The tube 30 may be formed of a resilient, flexible material, such as plastic or rubber compounds, that are capable of withstanding repeated deformation cycles. So constructed, the tube 30 may deform within a tire 12 into a flattened condition subject to external force and, upon removal of such force, return to an initial condition. In the example shown, the cross-section of the tube 30 in an unstressed state may be generally circular, but alternative cross-section geometries may also be used. The tube 30 may be of a diameter sufficient to operatively transfer a requisite volume of air for the purpose of pumping air into the tire cavity 28 to maintain the tire 12 at a preferred inflation pressure.

The peristaltic principles of incorporating a deformable air tube within a tire are shown and described in U.S. Pat. No. 8,113,254, incorporated herein by reference in its entirety. In this system, the tube is incorporated within an annular tire passageway formed within the tire proximate a tire bead region. As the tire rotates under load, air from outside the tire is admitted into the tube and pumped along the air tube by the progressive squeezing of the tube within the tire as the tire rotates. Air is thus forced into an outlet valve and then into the tire to maintain air pressure within the tire cavity at a desired pressure level.

The tube 30 may mount closely within the groove in the tire 12 and sequentially flatten as the tire rotates under load. The segment by segment flattening of the tube 30 as the tire 12 pumps air along the air passageway/groove and into the tire cavity 28 to maintain air pressure. A peristaltic pumping system 14 employing the tube 30 within a sidewall groove is shown in issued U.S. Pat. No. 8,042,586, incorporated herein by reference in its entirety.

The pump tube 30 may be generally annular and may circumscribe a lower tire sidewall region proximate to the bead region 22. However, other configurations for the tube 30 may be derived without departing from the present invention. Opposite ends 34, 36 of the tube 30 may connect to a pumping assembly 100. The pumping assembly 100 may include two pump tubes 101, 102 for connecting the ends of the tube 30 to the pumping assembly. The pump tubes 101, 102 may attach to a faceted housing 110 of the pumping assembly 14, which is threadedly attached to a valve stem 80 of the tire/rim assembly 12, 16. The faceting of the valve housing may reduce weight of the housing. Seated within the valve stem 80 may be a one-way check valve 76 that opens and closes to admit air from the tube 30 into the tire cavity 28 during a manual filling of the tire cavity. The valve housing 110 may further have a relief valve 105 that opens and closes to place the pumping assembly 14 in "open" and "closed" states. Air may be admitted into the valve housing 110 and may be directed from the tube 30 to the tire cavity 28. As described above, the tube 30 may be incorporated into a groove within a tire sidewall and may be incrementally flattened by rotation of the tire 12 under load.

A manual fill assembly 200 may be located at the upper end, or outer end, of the valve housing 101. The manual fill assembly 200 may include a check valve 202 such that the tire cavity 28 may be pressurized manually identically to manual pressurization directly through the valve stem 80.

Figure 5:
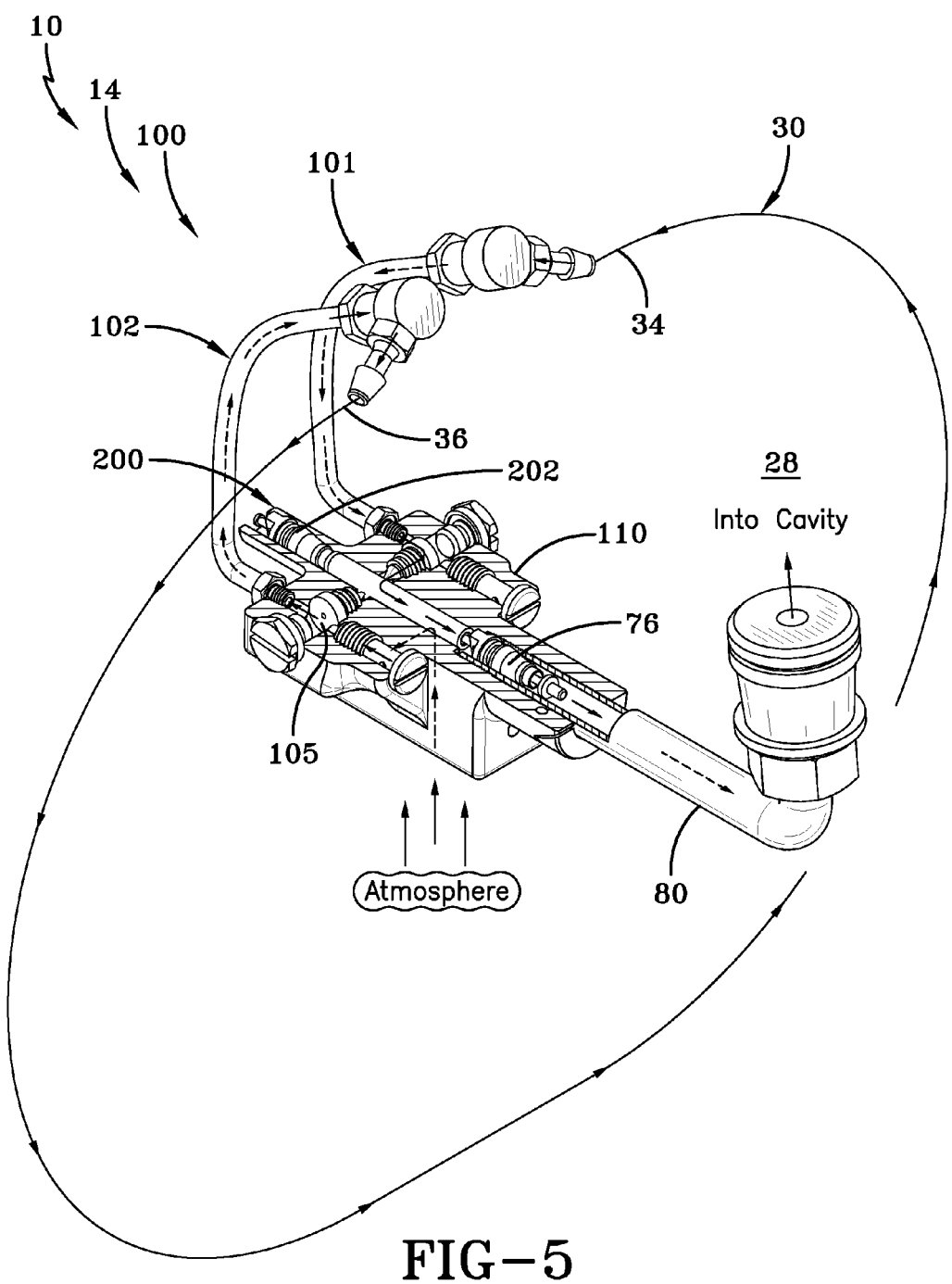
FIG. 5 is a schematic view showing a pump sub-assembly with the pump tube connection to the AMT valve stem regulator with the tire rotating in a first direction.
Figure 6:
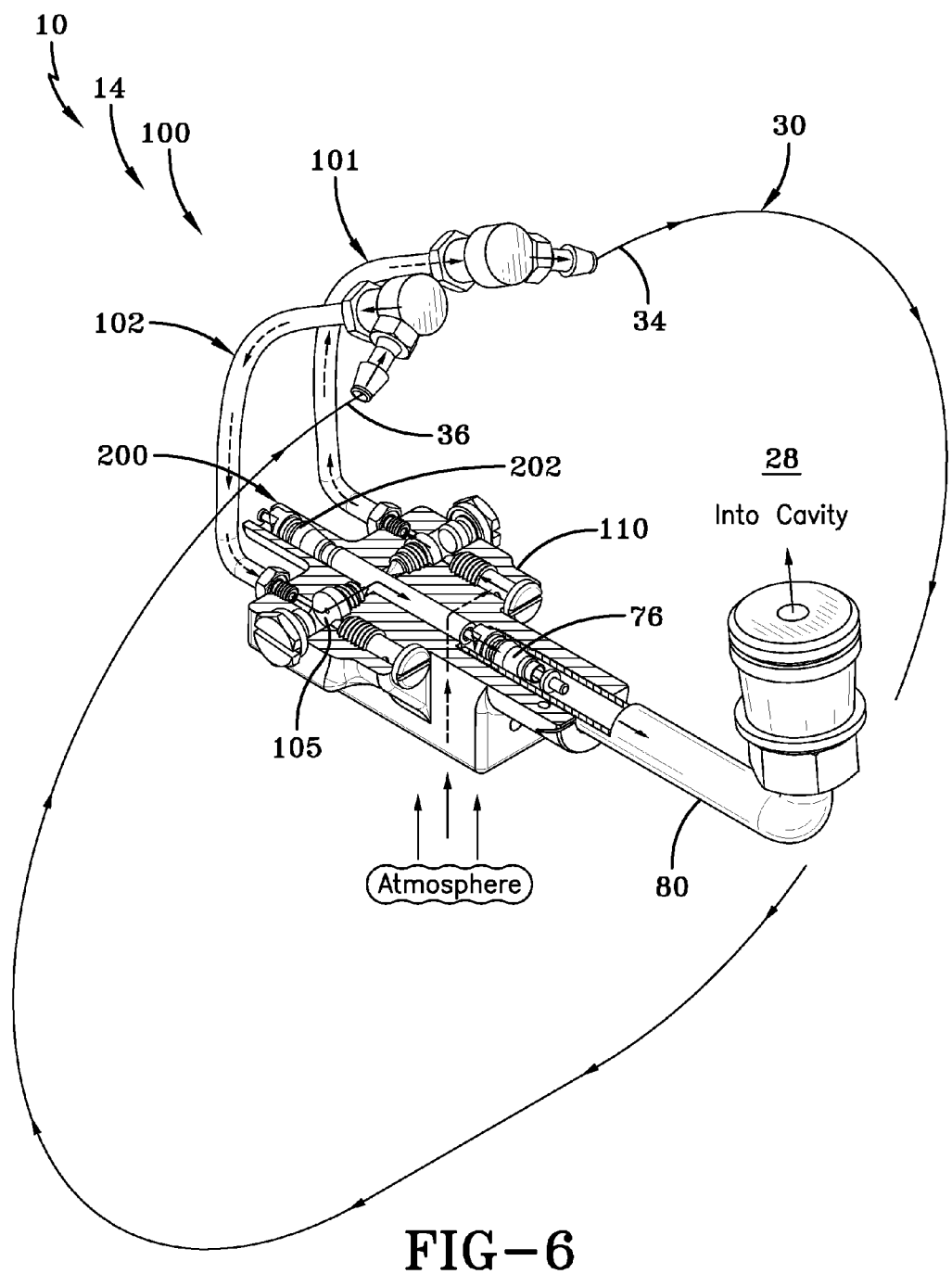
FIG. 6 is a schematic view showing a pump sub-assembly with the pump tube connection to the AMT valve stem regulator with the tire rotating in a second opposite direction.

FIGS. 5 and 6, respectively, show schematic diagram of the AMT assembly 10 for a counterclockwise rotation of the tire 12 (FIG. 5) and a clockwise rotation of the tire 12 (FIG. 6). As the tire 12 continues to rotate under load along a ground surface, the tube 30 may be sequentially flattened, or squeezed, when adjacent the tire footprint. The sequential flattening of the tube passageway, segment by segment, may direct evacuated air from the flattened segments to be pumped in the directions shown in FIGS. 5 and 6 to the housing 110.

When the air flow pressure is sufficient against the check valve 76, air may flow through the valve stem 80 and into the tire cavity 28 (FIG. 5). When air pressure within the tire cavity 28 is below the set pressure, air may pass from the connecting tube 32 to the valve housing 110 into the valve stem 80 and tire cavity. When air pressure within the tire cavity 28 is at or above the set pressure (FIG. 6), the check valve 76 closes and air cannot be pumped from the valve housing 110 into the valve stem 80. Instead, pressurized air may be retained within the valve housing 110 until vented through the relief valve 105 to atmosphere.

The check valve 76 of the valve stem 80 and the check valve 202 of the manual fill assembly 200 may include a conventional valve stem core used for conventional inflation of tires and a valve core. The valve core may be a "Schrader Valve Core" and include an elongate housing through which a valve shaft extends. A valve seal component may seat within the elongate housing and be coupled to the valve shaft. A biasing spring may encircle the valve shaft and bias the sealing component within the elongate housing in an "up", or "closed" position against the valve seal component. An air passageway through the valve core may be biased in the "closed" state until the valve shaft moves and the valve sealing component is moved thereby to a "down", or "open" position thereby allowing atmospheric air to enter the air passageway and be directed toward the tire cavity 28.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. An air maintenance tire assembly comprising:
a tire having a tire cavity bounded by first and second sidewalls extending to a tire tread region;
an air pump for generating pressurized air for maintaining air pressure within the tire cavity at a preset pressure level; and
a faceted valve housing disposed adjacent an outward end of a valve stem and operative to selectively open and close pressurized air flow from a valve stem internal passageway into the tire cavity, the first sidewall having at least one bending region operatively bending within a rolling tire footprint and a sidewall groove defined by groove sidewalls positioned within the bending region of the first tire sidewall, the groove deforming segment by segment between a non-deformed state and a deformed, constricted state in response to the bending of the first sidewall bending region within the rolling tire footprint.

2. The air maintenance tire assembly as set forth in claim 1 wherein the valve housing includes a check valve for maintaining air pressure in the tire cavity at the preset pressure level.

3. The air maintenance tire assembly as set forth in claim 1 wherein the valve housing is constructed of a polymer.

4. The air maintenance tire assembly as set forth in claim 1 wherein the valve housing further includes a relief valve that opens and closes to place the air pump in "open" and "closed" conditions.

5. The air maintenance tire assembly as set forth in claim 1 further including a tube within the first tire sidewall, the tube being incrementally flattened by rotation of the tire under load.

6. The air maintenance tire assembly as set forth in claim 5 wherein the valve housing further includes a manual fill assembly disposed at an outer end of the valve housing.

7. The air maintenance tire assembly as set forth in claim 6 wherein, as the tire continues to rotate under load along a ground surface, a part of a tube of the air pump is sequentially squeezed when the part is adjacent a tire footprint.

8. The air maintenance tire assembly as set forth in claim 7 wherein sequential flattening of part of the air pump, segment by segment, directs air to the valve housing and the tire cavity.

9. The air maintenance tire assembly as set forth in claim 8 wherein, when air pressure within the tire cavity is below the preset pressure level, air passes through the valve housing, through the valve stem, and into the tire cavity.

10. The air maintenance tire assembly as set forth in claim 9 wherein, when air pressure in the tire cavity is at the preset pressure level, air is vented through a relief valve to atmosphere.

11. A method of maintaining a predetermined air pressure within a tire comprising the steps of:
  positioning an elongate valve stem to project outward from a tire cavity of the tire, the valve stem having an elongate internal air passageway for delivering pressurized air into the tire cavity;
  positioning a faceted valve housing onto the valve stem;
  selectively opening and closing the valve stem internal air passageway to control pressurized air flow from the valve stem internal passageway into the tire cavity; and
  coupling an air pump to the valve housing such that pressurized air is directed through an outward end of the valve stem internal passageway and into the tire cavity, the air pump including a first sidewall of the tire with at least one bending region operatively bending when adjacent a tire footprint and a sidewall groove defined by groove sidewalls positioned within the bending region of the first tire sidewall, the groove deforming segment by segment between a non-deformed state and a deformed, constricted state in response to the bending of the first sidewall bending region within the tire footprint.

12. The method as set forth in claim 11 further comprising the steps of:
  supporting the tire on a rim;
  extending the valve stem from the tire through an aperture in the rim; and
  positioning the valve housing external to the tire cavity.

13. The method as set forth in claim 12 further comprising a check valve in the valve stem for selectively opening and closing an air passage from the valve stem passageway into the tire cavity.

14. The method as set forth in claim 13 further comprising the step of incorporating a relief valve within the valve housing.

15. The method as set forth in claim 14 further comprising the steps of:
  coupling an internal chamber of the valve housing to receive pressurized air the air pump; and
  selectively opening and closing a check valve of the valve stem responsive to a presence and absence of pressurized air within the internal chamber.

* * * * *